US012565402B2

(12) United States Patent
Toritani et al.

(10) Patent No.: US 12,565,402 B2
(45) Date of Patent: Mar. 3, 2026

(54) MULTI-CAR ELEVATOR SYSTEM

(71) Applicant: Mitsubishi Electric Corporation, Tokyo (JP)

(72) Inventors: Akiyuki Toritani, Tokyo (JP); Kazunori Washio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1283 days.

(21) Appl. No.: 17/292,717

(22) PCT Filed: Feb. 8, 2019

(86) PCT No.: PCT/JP2019/004665
§ 371 (c)(1),
(2) Date: May 11, 2021

(87) PCT Pub. No.: WO2020/161902
PCT Pub. Date: Aug. 13, 2020

(65) Prior Publication Data

US 2021/0395040 A1 Dec. 23, 2021

(51) Int. Cl.
*B66B 5/00* (2006.01)
*B66B 1/24* (2006.01)
(Continued)

(52) U.S. Cl.
CPC .......... *B66B 5/0056* (2013.01); *B66B 1/2433* (2013.01); *B66B 3/002* (2013.01);
(Continued)

(58) Field of Classification Search
CPC ..... B66B 5/0056; B66B 1/2433; B66B 3/002; B66B 5/0087; B66B 5/025; B66B 5/04
(Continued)

(56) References Cited

U.S. PATENT DOCUMENTS

2004/0154872 A1* 8/2004 Hirade ...................... B66B 1/18 187/394
2011/0220437 A1* 9/2011 Asano .................. B66B 1/2458 187/247
(Continued)

FOREIGN PATENT DOCUMENTS

CN 105836559 A * 8/2016 ........... B66B 5/0025
CN 109153533 A * 1/2019 ............... B66B 1/06
(Continued)

OTHER PUBLICATIONS

International Search Report and Written Opinion mailed on Apr. 9, 2019, received for PCT Application PCT/JP2019/004665, Filed on Feb. 8, 2019, 10 pages including English Translation.
(Continued)

*Primary Examiner* — Christina M Schreiber
(74) *Attorney, Agent, or Firm* — XSENSUS LLP

(57) ABSTRACT

Provided is a multi-car elevator system including: a plurality of cars to be raised and lowered in the same hoistway; and an inspection work controller. The inspection work controller is operated by a worker so as to move an operation target car which is one of the plurality of cars. Further, the operation target car is allowed to be selected from two or more of the cars in a work area in which the worker is present.

12 Claims, 13 Drawing Sheets

(51) Int. Cl.
*B66B 3/00* (2006.01)
*B66B 5/02* (2006.01)
*B66B 5/04* (2006.01)

(52) U.S. Cl.
CPC ............ *B66B 5/0087* (2013.01); *B66B 5/025* (2013.01); *B66B 5/04* (2013.01)

(58) Field of Classification Search
USPC .......................................................... 187/247
See application file for complete search history.

(56) References Cited

U.S. PATENT DOCUMENTS

| | | | | |
|---|---|---|---|---|
| 2013/0299282 A1* | 11/2013 | Kugiya | B66B 5/0031 187/247 |
| 2015/0291390 A1* | 10/2015 | Kakio | B66B 5/02 187/249 |
| 2018/0022572 A1* | 1/2018 | Taniyama | B66B 1/16 187/247 |
| 2018/0022573 A1* | 1/2018 | Hsu | B66B 5/0087 187/247 |
| 2018/0022574 A1* | 1/2018 | Pasini | B66B 11/0407 187/247 |
| 2018/0162689 A1* | 6/2018 | Kim | B66B 9/00 |
| 2019/0077633 A1* | 3/2019 | Shibata | B66B 5/00 |
| 2020/0140234 A1* | 5/2020 | Kallioniemi | B66B 1/2491 |
| 2021/0395040 A1* | 12/2021 | Toritani | B66B 5/0087 |

FOREIGN PATENT DOCUMENTS

| | | | | | |
|---|---|---|---|---|---|
| JP | 2003155171 A | * | 5/2003 | |
| JP | 2004189439 A | * | 7/2004 | |
| JP | 2006143392 A | * | 6/2006 | |
| JP | 4047629 B2 | * | 2/2008 | |
| JP | 2013216411 A | * | 10/2013 | |
| JP | 2014223966 A | * | 12/2014 | |
| JP | 2015-30590 A | | 2/2015 | |
| JP | 2015030590 A | * | 2/2015 | |
| JP | 5837853 B2 | * | 12/2015 | |
| JP | 2016155645 A | * | 9/2016 | |
| JP | 2023059338 A | * | 4/2023 | |
| WO | WO-2017203558 A1 | * | 11/2017 | B66B 5/005 |
| WO | WO-2017216910 A1 | * | 12/2017 | B66B 1/18 |

OTHER PUBLICATIONS

Office Action issued on Jun. 28, 2022, in corresponding Chinese patent Application No. 201980087945.2, 15 pages.

* cited by examiner

MULTI-CAR ELEVATOR SYSTEM

CROSS-REFERENCE TO RELATED APPLICATION

The present application is based on PCT filing PCT/JP2019/004665, filed Feb. 8, 2019, the entire contents of which are incorporated herein by reference.

TECHNICAL FIELD

The present invention relates to a multi-car elevator system in which a plurality of cars are provided in the same hoistway.

BACKGROUND ART

In a related-art multi-car elevator, an operation mode changeover switch and a manually-operated button are provided on a top of a car. When the manually-operated button is operated after an operation mode is switched to a manual operation mode through use of the operation mode changeover switch, a car carrying a worker can be manually moved (see, for example, Patent Literature 1).

CITATION LIST

Patent Literature

[PTL 1] WO 2017/216910 A1

SUMMARY OF INVENTION

Technical Problem

In the related-art multi-car elevator as described above, when the worker gets on a top of a second car and, for example, the second car is manually operated to be raised, a first car may be stopped above the second car. In this case, in order to perform maintenance work above a position at which the first car is stopped, a maintenance worker is required to move to the top of the first car to perform the maintenance work. Otherwise, the maintenance worker is required to move to the top of the first car to move the first car further upward, and then return back to the top of the second car to raise the second car. As a result, efficiency of the maintenance work is reduced.

The present invention has been made to solve the problem described above, and has an object to provide a multi-car elevator system with which efficiency of maintenance work can be improved.

Solution to Problem

According to one embodiment of the present invention, there is provided a multi-car elevator system including: a plurality of cars to be raised and lowered in the same hoistway; and an inspection work controller to be operated by a worker to move an operation target car being one of the plurality of cars, wherein the operation target car is allowed to be selected from two or more of the plurality of cars in a work area in which the worker is present.

Advantageous Effects of Invention

According to the multi-car elevator system of the present invention, the operation target car can be selected from two or more cars in the work area in which the worker is present, and hence the efficiency of the maintenance work can be improved.

DESCRIPTION OF EMBODIMENTS

Now, an embodiment of the present invention is described with reference to the drawings.

First Embodiment

Figure 1:
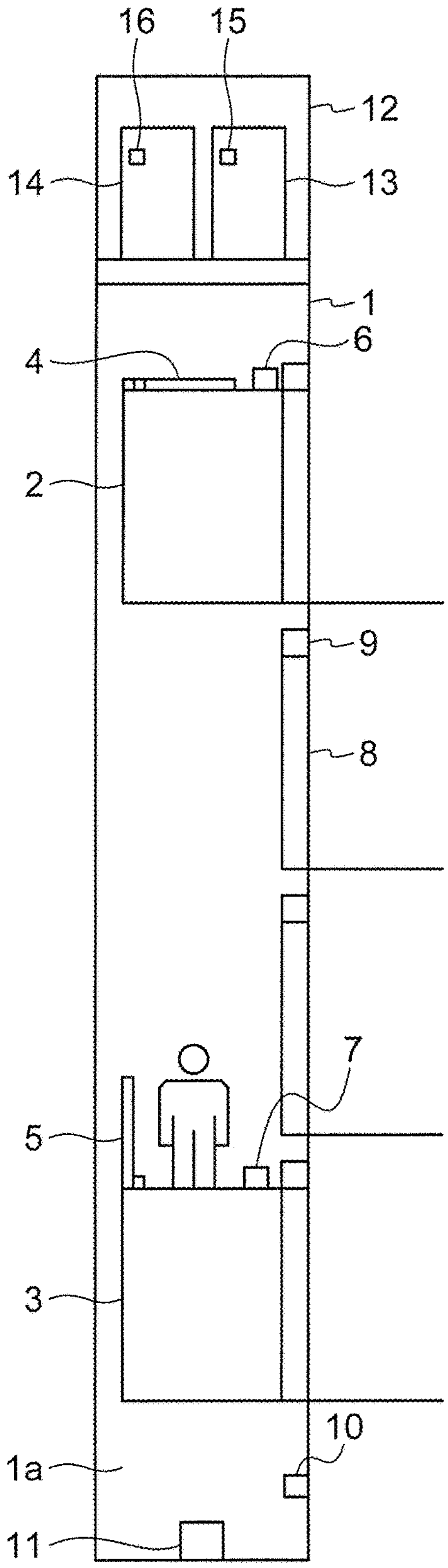
FIG. 1 is a schematic configuration view for illustrating a multi-car elevator system according to a first embodiment of the present invention.

FIG. 1 is a schematic configuration view for illustrating a multi-car elevator system according to a first embodiment of the present invention. In FIG. 1, in a hoistway 1, a first car 2 and a second car 3 are provided. The first car 2 is arranged immediately above the second car 3. The first car 2 and the second car 3 are raised and lowered independently of each other in the same hoistway 1.

At an upper portion of the first car 2, a first car-top guardrail 4 is provided. At an upper portion of the second car 3, a second car-top guardrail 5 is provided. Each of the car-top guardrails 4 and 5 can be displaced between a storage position and a use position. The storage position is a position at which the car-top guardrail is laid down and stored on the top of the car. The use position is a position at which the car-top guardrail is upright on the top of the car.

Each of the car-top guardrails 4 and 5 is positioned at the storage position at the time of normal operation. Further, each of the car-top guardrails 4 and 5 is displaced by a worker to the use position at the time of maintenance work in a car top area serving as a work area. Further, each of the car-top guardrails 4 and 5 is displaced by the worker to the storage position when the maintenance work is finished. In FIG. 1, the first car-top guardrail 4 is positioned at the storage position, and the second car-top guardrail 5 is positioned at the use position.

At the upper portion of the first car 2, a first car-top controller 6 is provided as an inspection work controller. The first car-top controller 6 is operated by the worker at the time of maintenance work in the car top area of the first car 2.

At the upper portion of the second car 3, a second car-top controller 7 is provided as the inspection work controller. The second car-top controller 7 is operated by the worker at the time of maintenance work in the car top area of the second car 3.

Landing doorways are provided at respective landings of a plurality of floors. Each of the landing doorways is opened and closed by a landing door 8. At an upper portion of each of the landing doorways, a landing door switch 9 is provided. The landing door switch 9 is configured to detect that the corresponding landing door 8 is positioned at a fully-closed position.

In a hoistway pit 1*a*, a pit controller 10 and a buffer 11 are provided. The pit controller 10 serves as the inspection work controller. The pit controller 10 is operated by the worker at the time of work in the hoistway pit 1*a* serving as the work area.

At an upper portion of the hoistway 1, a machine room 12 is provided. In the machine room 12, a first operation control device 13 and a second operation control device 14 are provided. The first operation control device 13 is configured to control the operation of the first car 2. The second operation control device 14 is configured to control the operation of the second car 3.

The first operation control device 13 has a first control panel connector 15 provided thereto. The second operation control device 14 has a second control panel connector 16 provided thereto. Further, the first and second operation control devices 13 and 14 each include an independent computer.

Figure 2:
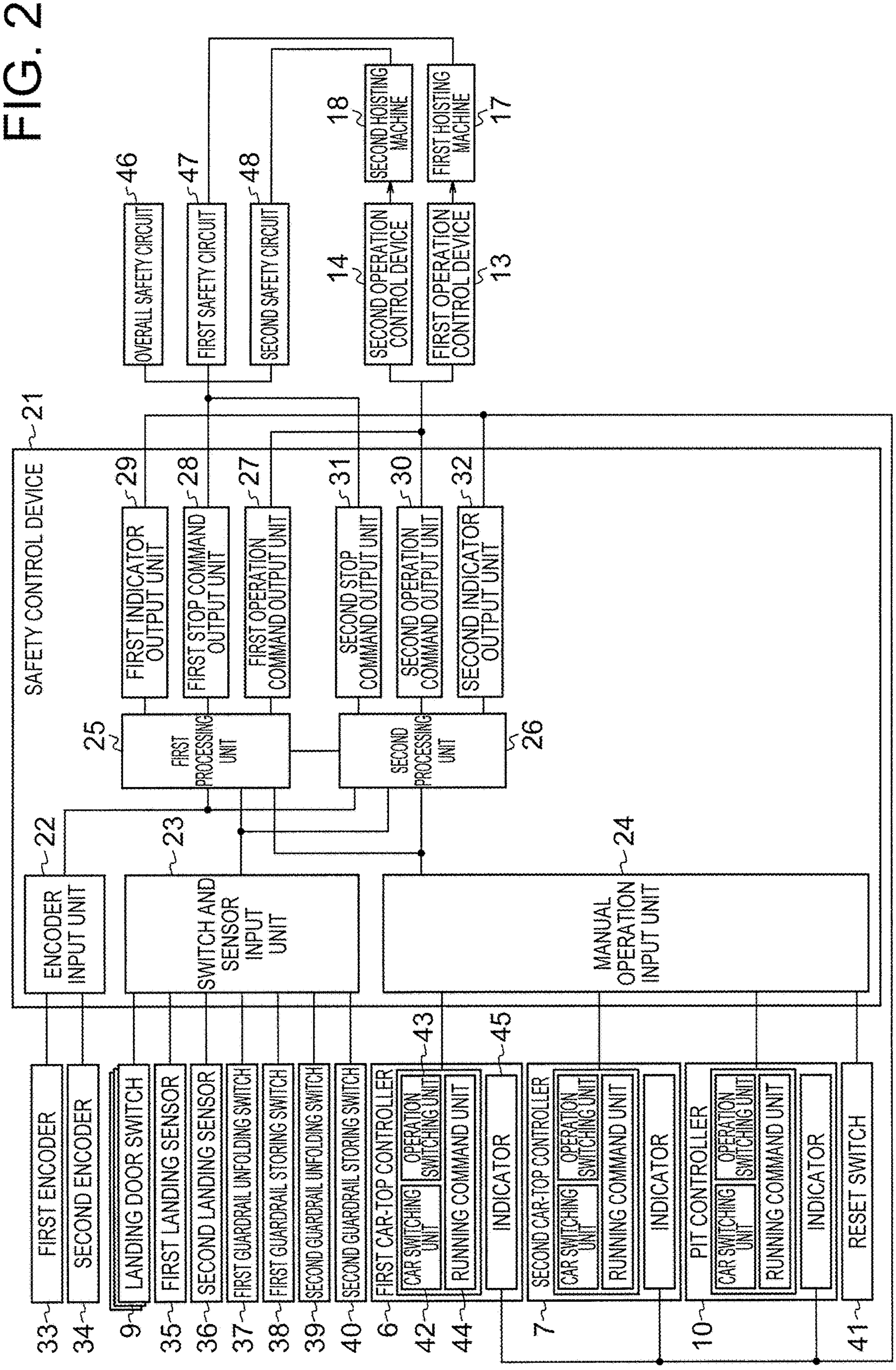
FIG. 2 is a block diagram for illustrating a detailed configuration of the multi-car elevator system of FIG. 1.

FIG. 2 is a block diagram for illustrating a detailed configuration of the multi-car elevator system of FIG. 1. Although not shown in FIG. 1, in the machine room 12, a first hoisting machine 17, a second hoisting machine 18, and a safety control device 21 are provided.

The first operation control device 13 is configured to control the first hoisting machine 17 to control the operation of the first car 2. The second operation control device 14 is configured to control the second hoisting machine 18 to control the operation of the second car 3.

Each of the hoisting machines 17 and 18 includes a drive sheave, a hoisting machine motor, and a hoisting machine brake. The hoisting machine motor is configured to rotate the drive sheave. The hoisting machine brake is configured to maintain a stationary state of the drive sheave, or brake the rotation of the drive sheave.

The drive sheave of the first hoisting machine 17 has a first suspension body (not shown) wound therearound. The drive sheave of the second hoisting machine 18 has a second suspension body (not shown) wound therearound. As each of the first and second suspension bodies, a plurality of ropes or a plurality of belts are used.

The first car 2 is suspended by the first suspension body in the hoistway 1. Further, the first car 2 is raised and lowered in the hoistway 1 by rotating the drive sheave of the first hoisting machine 17.

The second car 3 is suspended by the second suspension body in the hoistway 1. Further, the second car 3 is raised and lowered in the hoistway 1 by rotating the drive sheave of the second hoisting machine 18.

The safety control device 21 includes, as functional blocks, an encoder input unit 22, a switch and sensor input unit 23, a manual operation input unit 24, a first processing unit 25, a second processing unit 26, a first operation command output unit 27, a first stop command output unit 28, a first indicator output unit 29, a second operation command output unit 30, a second stop command output unit 31, and a second indicator output unit 32.

The encoder input unit 22 is configured to receive, as input, a signal from a first encoder 33 and a signal from a second encoder 34. The first encoder 33 is configured to generate a signal corresponding to a speed of the first car 2. The second encoder 34 is configured to generate a signal corresponding to a speed of the second car 3.

The switch and sensor input unit 23 is configured to receive, as input, a signal from each of the landing door switches 9, a signal from a first landing sensor 35, a signal from a second landing sensor 36, a signal from a first guardrail unfolding switch 37, a signal from a first guardrail storing switch 38, a signal from a second guardrail unfolding switch 39, and a signal from a second guardrail storing switch 40.

The first landing sensor 35 is configured to detect that the first car 2 is positioned at a landing position. The second landing sensor 36 is configured to detect that the second car 3 is positioned at a landing position.

The first guardrail unfolding switch 37 is configured to detect that the first car-top guardrail 4 is positioned at the use position. The first guardrail storing switch 38 is configured to detect that the first car-top guardrail 4 is positioned at the storage position.

The second guardrail unfolding switch 39 is configured to detect that the second car-top guardrail 5 is positioned at the use position. The second guardrail storing switch 40 is configured to detect that the second car-top guardrail 5 is positioned at the storage position.

The manual operation input unit 24 is configured to receive, as input, a signal from the first car-top controller 6, a signal from the second car-top controller 7, a signal from the pit controller 10, and a signal from a reset switch 41.

The first car-top controller 6, the second car-top controller 7, and the pit controller 10 each include a car switching unit 42, an operation switching unit 43, a running command unit 44, and an indicator 45 serving as a notification unit.

The car switching unit 42 is configured to switch an operation target car to be operated by each of the controllers 6, 7, and 10. That is, in the multi-car elevator system of the first embodiment, the operation target car can be selected from the first and second cars 2 and 3 in the work area in which the worker is present.

The operation switching unit 43 is configured to switch an operation mode between an automatic operation mode and a manual operation mode. The running command unit 44 is configured to output a running command for the operation target car in the manual operation mode.

The reset switch 41 is provided in the machine room 12 or the vicinity of the landing, and is to be operated by the worker after the maintenance work is finished. The safety control device 21 does not allow restoration to the automatic operation until the reset switch 41 is operated.

The first and second processing units 25 and 26 are configured to execute safety control processing based on signals from the encoder input unit 22, the switch and sensor input unit 23, and the manual operation input unit 24. The first and second processing units 25 and 26 are configured to compare their calculation results to monitor presence or absence of abnormalities of the first and second processing units 25 and 26 themselves.

The first operation command output unit 27 is configured to output an operation command to the first operation control device 13 or the second operation control device 14 based on the calculation result of the first processing unit 25. The second operation command output unit 30 is configured to output an operation command to the first operation control device 13 or the second operation control device 14 based on the calculation result of the second processing unit 26.

The first stop command output unit 28 is configured to output a stop command to an overall safety circuit 46, a first safety circuit 47, and a second safety circuit 48 based on the calculation result of the first processing unit 25. The second stop command output unit 31 is configured to output a stop command to the overall safety circuit 46, the first safety circuit 47, and the second safety circuit 48 based on the calculation result of the second processing unit 26.

When the first safety circuit 47 receives the stop command, the first safety circuit 47 interrupts supply of power to the first hoisting machine 17. In this manner, the operation of the first car 2 is stopped.

When the second safety circuit 48 receives the stop command, the second safety circuit 48 interrupts supply of power to the second hoisting machine 18. In this manner, the operation of the second car 3 is stopped.

When the overall safety circuit 46 receives the stop command, the overall safety circuit 46 interrupts supply of power to all of the hoisting machines 17 and 18. In this manner, the operations of all of the cars 2 and 3 are stopped.

The safety control device 21 is configured to determine that, when it is detected that a landing doorway through which the worker can enter the hoistway pit 1*a*, for example, a bottom-floor landing doorway is opened, the worker has entered the hoistway pit 1*a*. That is, the bottom-floor landing door switch 9 is a pit entry detection device.

The safety control device 21 is configured to determine that, when it is detected that the first car-top guardrail 4 is not positioned at the storage position, the worker is on board in the car top area of the first car 2. That is, the first guardrail storing switch 38 is a boarding detection device corresponding to the first car 2.

The safety control device 21 is configured to determine that, when it is detected that the second car-top guardrail 5 is not positioned at the storage position, the worker is on board in the car top area of the second car 3. That is, the second guardrail storing switch 40 is a boarding detection device corresponding to the second car 3.

The safety control device 21 is configured to restrict, when entry of the worker into the hoistway pit 1*a*, boarding of the worker to the car top area of the first car 2, or boarding of the worker to the car top area of the second car 3 is detected, a moving range of the operation target car in accordance with the work area in which the worker is detected.

In the safety control device 21, a plurality of safety distances are set to restrict the moving range of the operation target car. The safety control device 21 is configured to stop the operation target car so that a distance between the operation target car and an object does not become smaller than the safety distance at the time of operation in the manual operation mode, that is, at the time of inspection operation.

The safety distances include an inter-car safety distance, a top safety distance, and a pit safety distance. The inter-car safety distance is a safety distance between cars that are vertically adjacent to each other. The top safety distance is a safety distance between the highest car and a hoistway top. The pit safety distance is a safety distance between the lowest car and a hoistway bottom.

Figure 3:
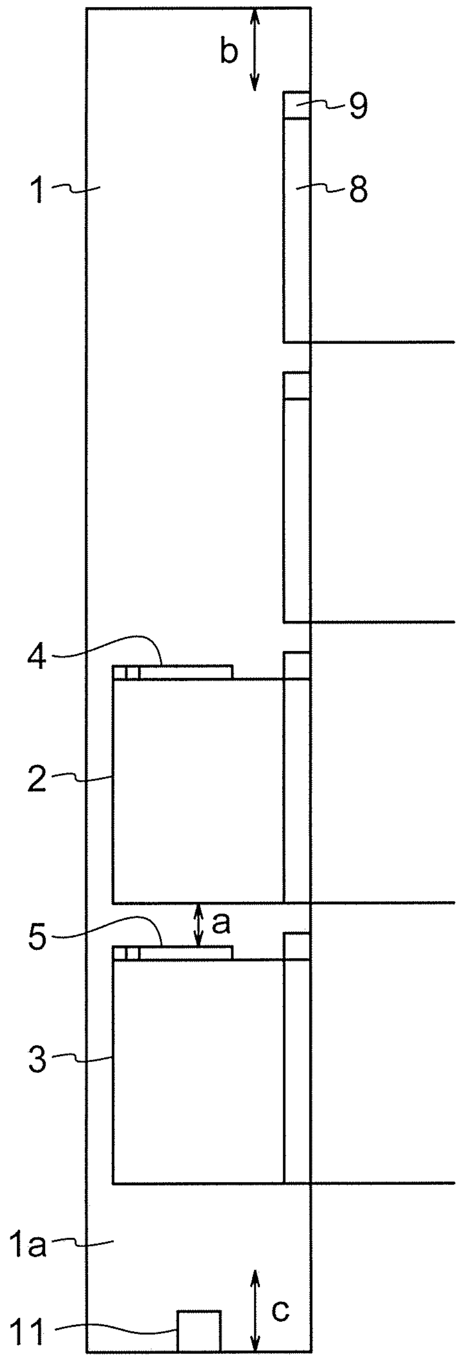
FIG. 3 is an explanatory view for illustrating safety distances at the time of normal operation.

FIG. 3 is an explanatory view for illustrating the safety distances at the time of normal operation. At the time of normal operation, a first inter-car safety distance “a”, a first top safety distance “b”, and a first pit safety distance “c” are applied.

Figure 4:
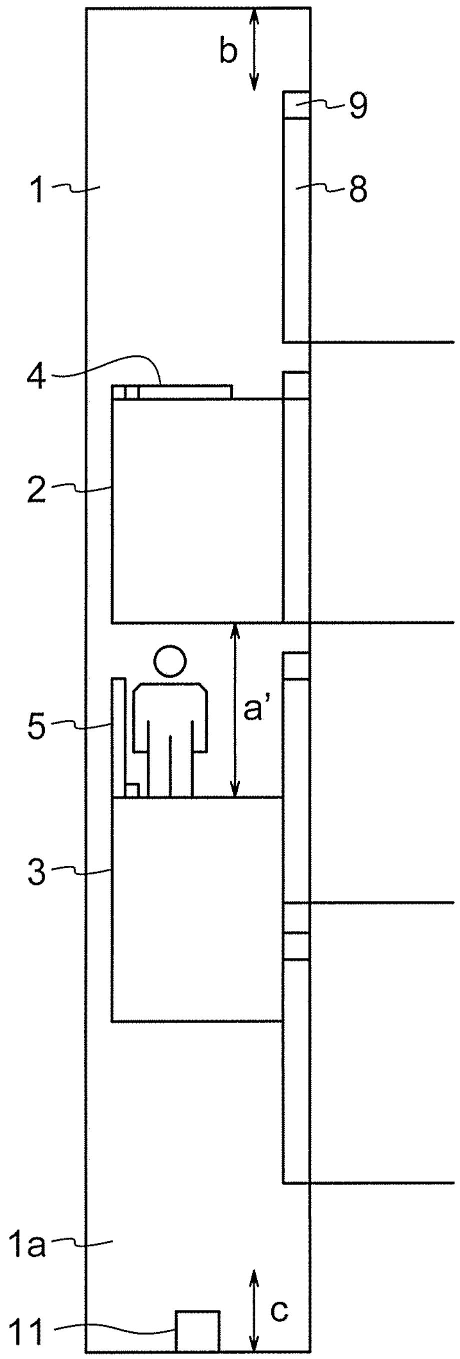
FIG. 4 is an explanatory view for illustrating safety distances in a case in which a worker is on board in a car top area of a second car.

FIG. 4 is an explanatory view for illustrating the safety distances in a case in which the worker is on board in the car top area of the second car 3. In this case, a second inter-car safety distance “a'”, the first top safety distance “b”, and the first pit safety distance “c” are applied. The second inter-car safety distance “a'” is determined based on a worker evacuation space and stopping distances of the cars 2 and 3, and is generally larger than the first inter-car safety distance “a”.

Figure 5:
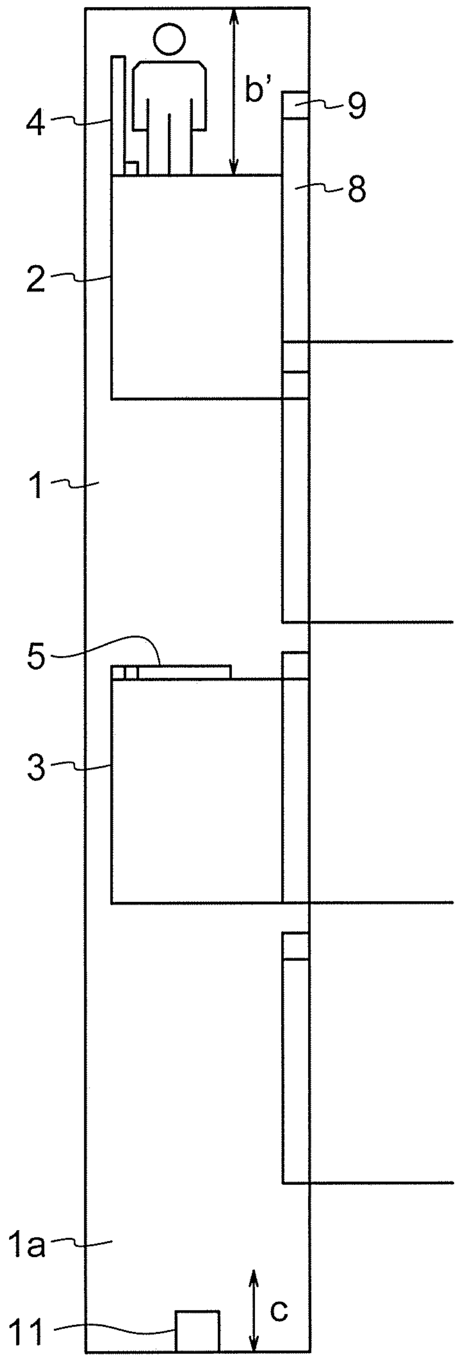
FIG. 5 is an explanatory view for illustrating safety distances in a case in which the worker is on board in a car top area of a first car.

FIG. 5 is an explanatory view for illustrating the safety distances in a case in which the worker is on board in the car top area of the first car 2. In this case, the first inter-car safety distance “a”, a second top safety distance “b'”, and the first pit safety distance “c” are applied. The second top safety distance “b'” is determined based on the worker evacuation space and the stopping distance of the first car 2, and is generally larger than the first top safety distance “b'”.

Figure 6:
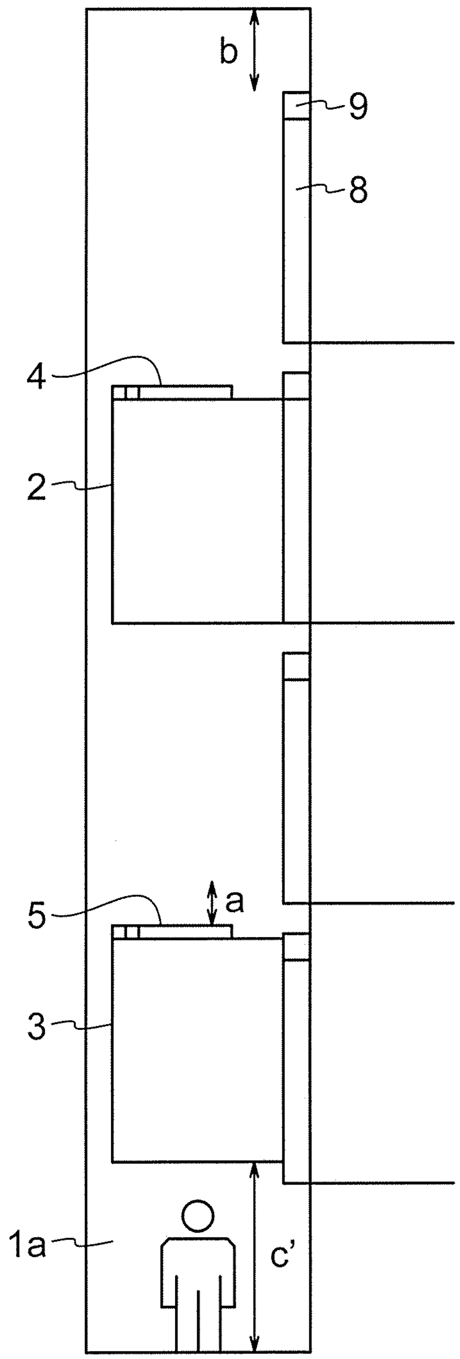
FIG. 6 is an explanatory view for illustrating safety distances in a case in which the worker enters a hoistway pit.

FIG. 6 is an explanatory view for illustrating the safety distances in a case in which the worker enters the hoistway pit 1*a*. In this case, the first inter-car safety distance “a”, the first top safety distance “b”, and a second pit safety distance “c'” are applied. The second pit safety distance “c'” is determined based on the worker evacuation space and the stopping distance of the second car 3, and is generally larger than the first pit safety distance “c”.

Figure 7:
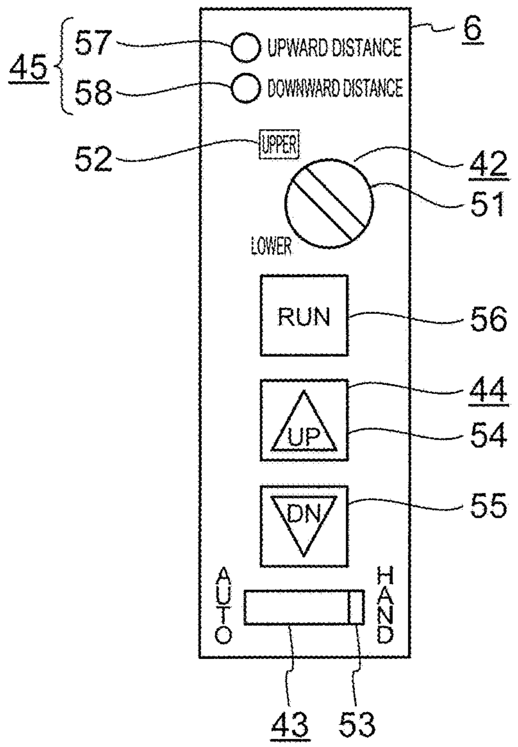
FIG. 7 is a front view for illustrating a first car-top controller of FIG. 2.

FIG. 7 is a front view for illustrating the first car-top controller 6 of FIG. 2. The car switching unit 42 includes a selector switch 51 and an own-car indication portion 52. The selector switch 51 is to be rotationally operated to switch the operation target car.

In this example, when the selector switch 51 is switched to “UPPER”, the operation target car is the first car 2, that is, the own car with the worker on board. Further, when the selector switch 51 is switched to “LOWER”, the operation target car is the second car 3, that is, the other car without the worker on board.

The own-car indication portion 52 shows the worker that the operation target car is the own car through inversion display. For example, when the “LOWER” indication representing the other car is printed in black, the own-car indication portion 52 has a white print on a black background.

The operation switching unit 43 includes a mode changeover switch 53. In this example, when the mode changeover switch 53 is switched to “HAND,” a command to switch the operation mode to the manual operation mode is input. Further, when the mode changeover switch 53 is switched to "AUTO," a command to switch the operation mode to the automatic operation mode is input.

The running command unit 44 includes an up button 54, a down button 55, and a running command button 56. In the manual operation mode, only while the up button 54 or the down button 55 and the running command button 56 are simultaneously pressed, the operation target car runs in the corresponding direction.

In the safety control device 21, an upper limit value of the speed of the operation target car for inspection operation is set. Further, at the time of inspection operation, when the speed of the operation target car exceeds the upper limit value, the safety control device 21 stops the operation target car.

The indicator 45 includes an up indicator 57 and a down indicator 58. When the operation target car is stopped due to the movement restriction by the safety control device 21 at the time of inspection operation in an upward direction, the up indicator 57 is turned on. When the operation target car is stopped due to the movement restriction by the safety control device 21 at the time of inspection operation in a downward direction, the down indicator 58 is turned on.

The configuration of the second car-top controller 7 is similar to that of the first car-top controller 6 except that "LOWER" corresponds to the own-car indication portion 52.

Further, the pit controller 10 is similar to the first car-top controller 6 except that no own-car indication portion 52 is provided. That is, in the pit controller 10, the indications corresponding to the first and second cars 2 and 3 are printed by a similar printing method. For example, when "UPPER" corresponding to the first car 2 is printed in black, "LOWER" corresponding to the second car 3 is also printed in black. It should be noted, however, that the second car 3 closest to the hoistway pit 1*a* may be considered as the own car, and the own-car indication portion 52 may be provided to the pit controller 10.

Further, the car-top controller may not be provided in advance on each of the cars, and the worker may carry the car-top controller to the car top area to connect the car-top controller to a car-top connector.

Figure 8:
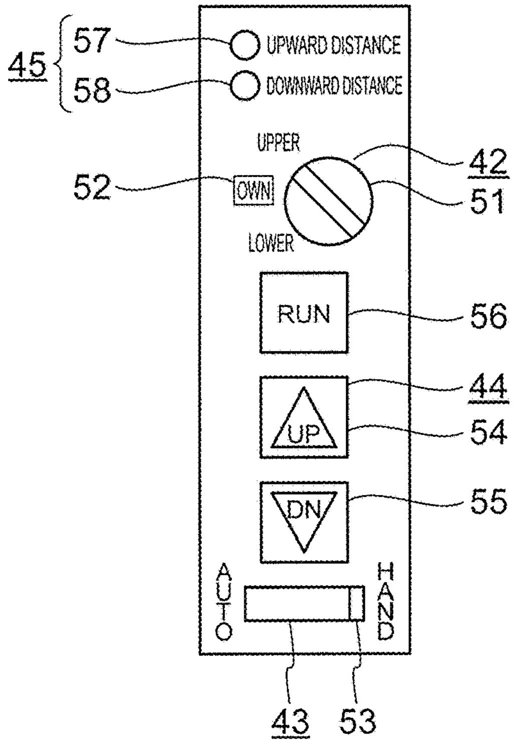
FIG. 8 is a front view for illustrating an example of a car-top controller in a case in which three cars are provided in the same hoistway.

Further, FIG. 8 is a front view for illustrating an example of the car-top controller in a case in which three cars are provided in the same hoistway. FIG. 8 shows a case in which the second car from the top, that is, the middle car is the own car. The pit controller in the case in which three cars are provided in the same hoistway may omit the own-car indication portion 52 of FIG. 8, and the indication corresponding to the middle car may be "MIDDLE."

Figure 9:
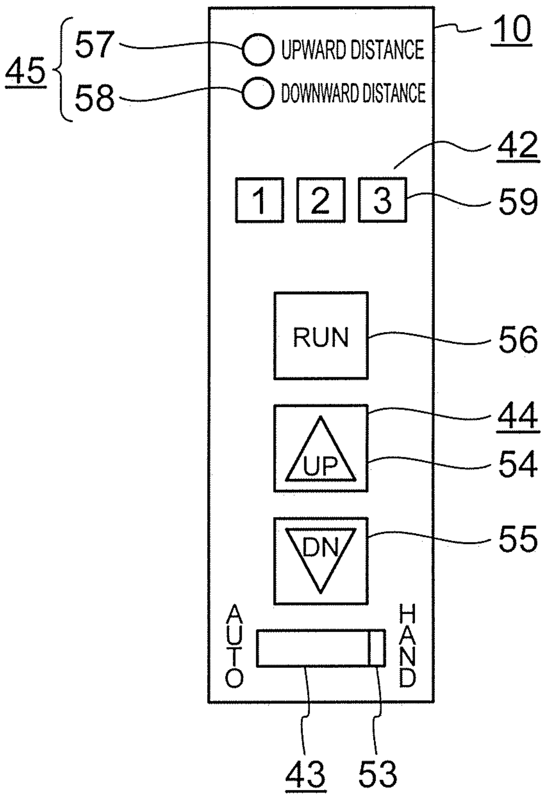
FIG. 9 is a front view for illustrating a modification example of the car-top controller and a pit controller in the case in which three cars are provided in the same hoistway.

Further, FIG. 9 is a front view for illustrating a modification example of the car-top controller and the pit controller in the case in which three cars are provided in the same hoistway. The car switching unit 42 in this example includes a plurality of push buttons 59 with lamps in place of the selector switch 51. When one of the push buttons 59 with lamps is pressed, the corresponding numbered car is set as the operation target car, and the pressed push button 59 with a lamp is turned on.

Figure 10:
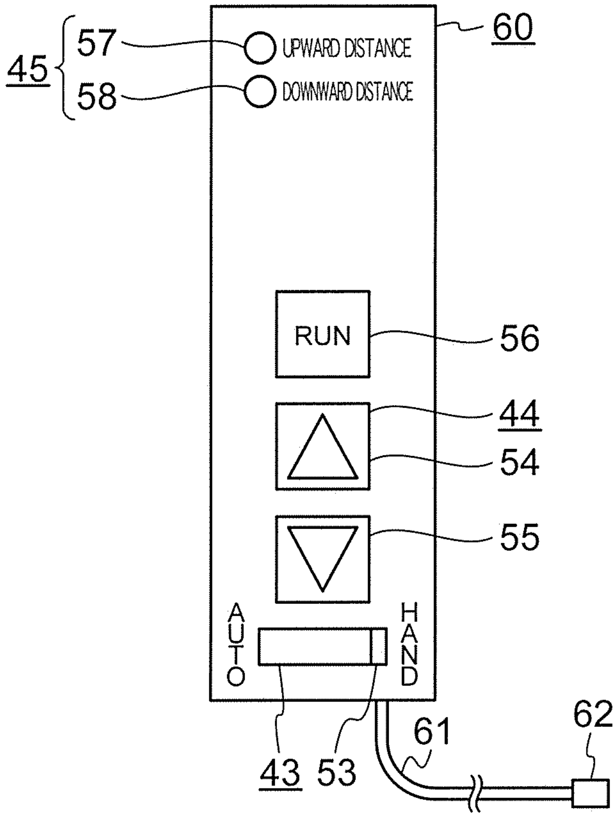
FIG. 10 is a front view for illustrating a machine room controller to be connected to first and second control panel connectors of FIG. 1.

FIG. 10 is a front view for illustrating a machine room controller to be connected to the first and second control panel connectors 15 and 16 of FIG. 1. When the worker enters the machine room 12 to perform the maintenance work, the machine room 12 is the work area. A machine room controller 60 serving as the inspection work controller is selectively connected to one of the first control panel connector 15 or the second control panel connector 16. Then, through selection of the control panel connector 15 or 16 to be connected to the machine room controller 60, the operation target car can be selected.

Therefore, no car switching unit 42 is provided to the machine room controller 60. Further, a wiring line 61 is led out from the machine room controller 60. At a leading end of the wiring line 61, a controller connector 62 is provided so as to allow connection to each of the first and second control panel connectors 15 and 16. Other configurations are similar to those of the first car-top controller 6.

Figure 11:
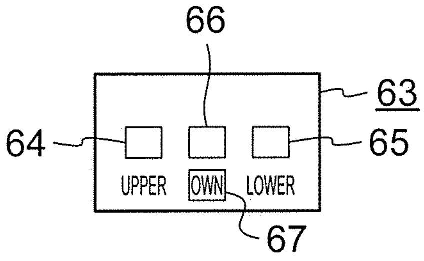
FIG. 11 is a front view for illustrating an example of a controller connection unit to be provided on a top of a car.

The car-top controller can have a configuration similar to that of the machine room controller 60 illustrated in FIG. 10. In this case, for example, a controller connection unit 63 illustrated in FIG. 11 is provided to the car. FIG. 11 shows the controller connection unit 63 in the case in which three cars are provided in the same hoistway.

The controller connection unit 63 includes a first car connector 64, a second car connector 65, a third car connector 66, and an own-car indication portion 67. The operation target car can be selected by selecting one of the car connectors 64, 65, and 66 to be connected to the car-top controller.

The own-car indication portion 67 shows the worker that the operation target car is the own car through inversion display. FIG. 11 shows a case in which the middle car is the own car.

Further, in place of the pit controller 10, a pit controller similar to the machine room controller 60 illustrated in FIG. 10 can be used. In this case, in the hoistway pit 1*a*, the controller connection unit 63 similar to that of FIG. 11 is provided. Further, in the controller connection unit 63 of the hoistway pit 1*a*, the own-car indication portion 67 may be omitted, or the car closest to the hoistway pit 1*a* may be set as the own car.

Figure 12:
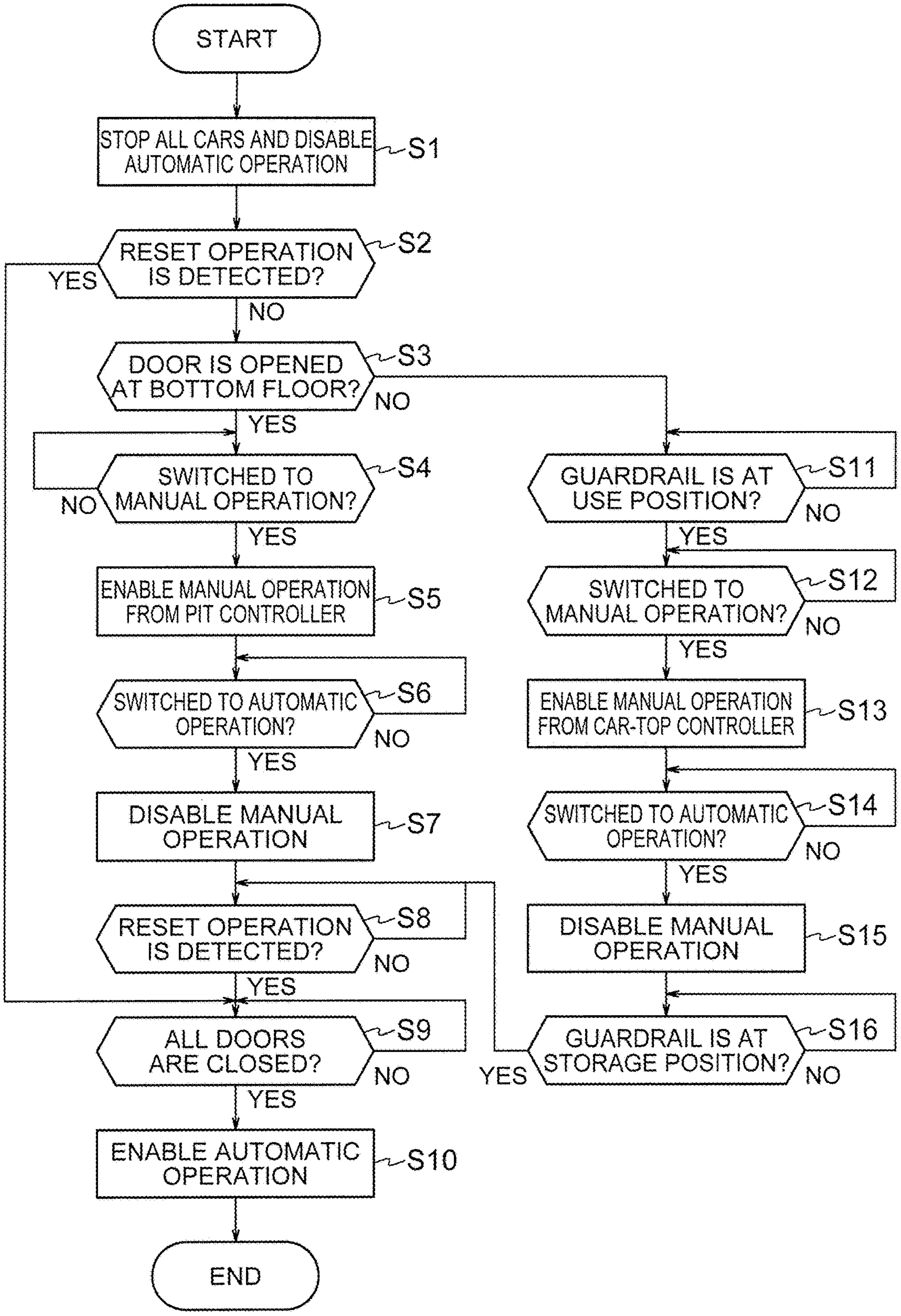
FIG. 12 is a flow chart for illustrating an operation of a safety control device in a case in which a landing door is solely opened.

FIG. 12 is a flow chart for illustrating the operation of the safety control device 21 in a case in which the landing door 8 is solely opened. When any of the landing doors 8 is opened under a state in which the car door is closed, in Step S1, the safety control device 21 stops the operations of all of the cars, that is, the first and second cars 2 and 3, and disables the automatic operation.

Next, in Step S2, the safety control device 21 checks whether or not the reset switch 41 is operated. When the reset switch 41 is not operated, in Step S3, the safety control device 21 checks whether or not the opened landing door 8 is the bottom-floor landing door 8.

When the bottom-floor landing door 8 is opened, in Step S4, the safety control device 21 waits until the operation switching unit 43 of the pit controller 10 is switched to manual operation. When the operation switching unit 43 is switched to manual operation, in Step S5, the safety control device 21 enables the manual operation from the pit controller 10.

After that, in Step S6, the safety control device 21 monitors whether or not the operation switching unit 43 is switched to automatic operation. Until the operation switching unit 43 is switched to automatic operation, the manual operation is enabled. When the operation switching unit 43 is switched to automatic operation, in Step S7, the safety control device 21 disables the manual operation.

When the manual operation is disabled, in Step S8, the safety control device 21 waits until the reset switch 41 is operated. When the reset switch 41 is operated, in Step S9, the safety control device 21 waits until all of the landing doors 8 are brought to a fully-closed state.

Then, when all of the landing doors 8 are brought to the fully-closed state, in Step S10, the safety control device 21 enables the automatic operation and ends the processing.

When, in Step S3, the opened landing door 8 is not the bottom-floor landing door 8, in Step S11, the safety control device 21 waits until the first car-top guardrail 4 or the second car-top guardrail 5 is displaced to the use position.

When the first car-top guardrail 4 or the second car-top guardrail 5 is displaced to the use position, in Step S12, the safety control device 21 waits until the operation switching unit 43 of the corresponding car-top controller 6 or 7 is switched to the manual operation. When the operation switching unit 43 is switched to the manual operation, in Step S13, the safety control device 21 enables the manual operation from the corresponding car-top controller 6 or 7.

After that, in Step S14, the safety control device 21 monitors whether or not the operation switching unit 43 is switched to automatic operation. Until the operation switching unit 43 is switched to automatic operation, the manual operation is enabled. When the operation switching unit 43 is switched to automatic operation, in Step S15, the safety control device 21 disables the manual operation.

After that, in Step S16, the safety control device 21 waits until the corresponding car-top guardrail 4 or 5 is stored to the storage position. When the corresponding car-top guardrail 4 or 5 is stored to the storage position, the safety control device 21 advances to the processing of Step S8.

Further, when, in Step S2, the reset switch 41 is operated, the safety control device 21 advances to the processing of Step S9.

Figure 13:
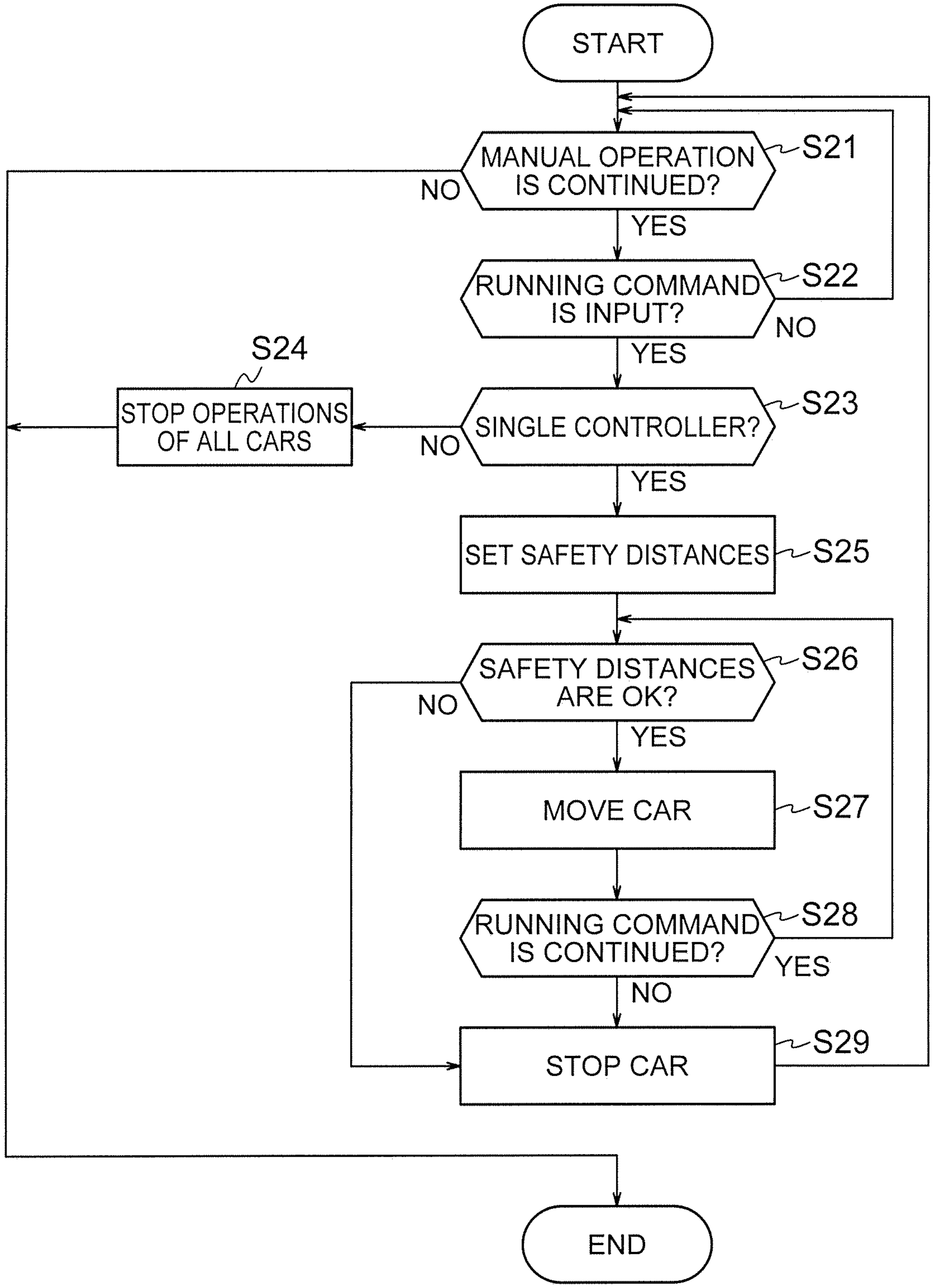
FIG. 13 is a flow chart for illustrating an operation of the safety control device in a manual operation mode.

FIG. 13 is a flow chart for illustrating the operation of the safety control device 21 in the manual operation mode. In the manual operation mode, in Step S21, the safety control device 21 checks whether or not the manual operation mode is continued. When the manual operation mode is not continued, the processing is ended.

When the manual operation mode is continued, in Step S22, the safety control device 21 checks whether or not the running command is input from the running command unit 44. When the running command is not input, the safety control device 21 returns to the processing of Step S21.

When the running command is input, in Step S23, the safety control device 21 checks whether or not the input is from a single inspection work controller. When the input is not from a single inspection work controller, in Step S24, the safety control device 21 stops the operations of all of the cars, that is, the first and second cars 2 and 3, and ends the processing.

When the input is from a single inspection work controller, in Step S25, the safety control device 21 sets the safety distances. As illustrated in FIG. 4 to FIG. 6, the safety distances are set based on the position of the worker and the running direction of the operation target car.

After that, in Step S26, the safety control device 21 determines whether or not the safety distances are secured. When the safety distances are secured, in Step S27, the safety control device 21 moves the operation target car in accordance with the running command.

After that, in Step S28, the safety control device 21 checks whether or not the running command is continued. When the running command is continued, the safety control device 21 repeats the processing from Step S26 to Step S28.

When the running command is not continued, in Step S29, the safety control device 21 stops the operation target car, and returns to the processing of Step S21.

When, in Step S26, the safety distances are not secured, the safety control device 21 advances to the processing of Step S29 without moving the operation target car in the direction input by the running command, and returns to the processing of Step S21. In this case, the operation target car is allowed to run in the reverse direction.

Figure 14:
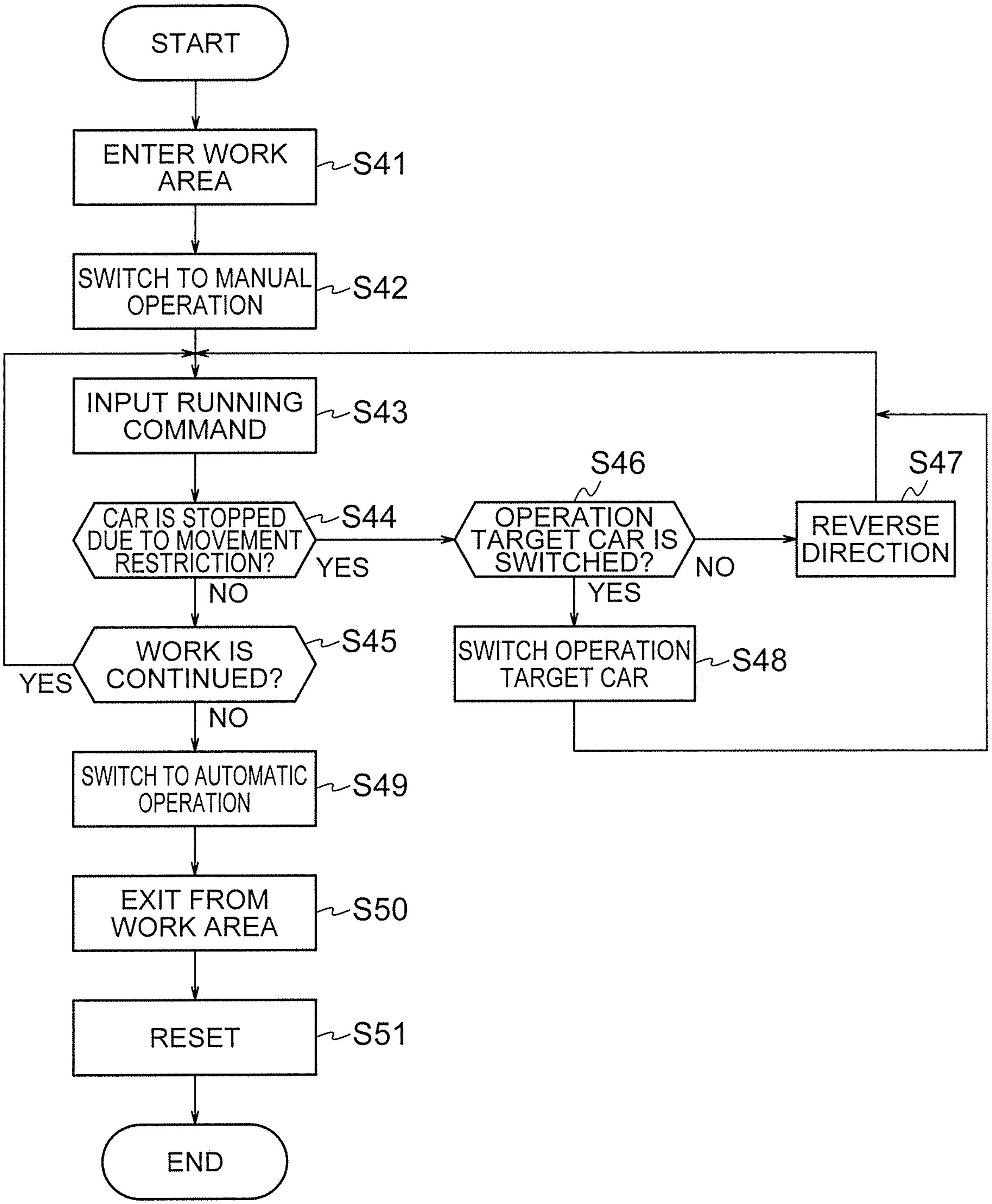
FIG. 14 is a flow chart for illustrating an operation of the worker in maintenance work.

FIG. 14 is a flow chart for illustrating the operation of the worker in the maintenance work. When the worker performs the maintenance work, in Step S41, the worker enters the work area.

At this time, when the work area is the car top area of the first car 2 or the second car 3, the worker enters the car top area from a landing doorway of a floor other than the bottom floor, and unfolds the corresponding car-top guardrail 4 or 5 to the use position. Further, when the work area is the hoistway pit 1*a*, the worker opens the bottom-floor landing door 8 to enter the hoistway pit 1*a*.

After that, in Step S42, the worker switches the operation switching unit 43 of the corresponding inspection work controller to manual operation. When the operation mode is switched to the manual operation mode, in Step S43, the worker inputs the running command to move the operation target car.

Then, in Step S44, the worker checks whether or not the operation target car is stopped due to the movement restriction by the safety control device 21. When the movement is not restricted, in Step S45, the worker determines whether or not to continue the maintenance work. When the maintenance work is to be continued, the worker returns to Step S43.

When, in Step S44, the operation target car is stopped due to the movement restriction, in Step S46, the worker determines whether or not to switch the operation target car. When the operation target car is not to be switched, in Step S47, the worker causes the operation target car to run in the reverse direction, and returns to Step S43.

When the operation target car is switched, in Step S48, the worker switches the operation target car through use of the car switching unit 42, and advances to Step S43.

When, in Step S45, the maintenance work is to be finished, in Step S49, the worker switches the operation switching unit 43 to automatic operation. After that, in Step S50, the worker exits from the work area.

At this time, when the work area is the car top area of the first car 2 or the second car 3, the worker displaces the corresponding car-top guardrail 4 or 5 to the storage position, and then moves to the landing. Then, the worker moves the corresponding landing door 8 to the fully-closed position. Further, when the work area is the hoistway pit 1*a*, the worker moves to the bottom-floor landing, and then moves the bottom-floor landing door 8 to the fully-closed position.

After that, in Step S51, the worker operates the corresponding reset switch 41, and ends the processing.

In such a multi-car elevator system, the operation target car can be selected from the first and second cars 2 and 3 and switched in the work area in which the worker is present. As a result, the worker can move a car other than the own car or move a car other than a car immediately above the hoistway pit 1*a* without exiting from the work area. Therefore, the efficiency of the maintenance work can be improved.

Further, the inspection work controller includes the car switching unit 42 configured to switch the operation target car. Therefore, the operation target car can be easily switched.

Further, the operation target car may be allowed to be selected by selecting one of the connectors 15, 16, 64, and 65 to be connected to the inspection work controller. In this case, the operation target car can be easily switched through use of an inspection work controller having no car switching unit 42.

Further, the first control panel connector 15 is provided to the first operation control device 13, and the second control panel connector 16 is provided to the second operation control device 14. Therefore, even when the work area is the machine room 12, the operation target car can be easily switched.

Further, the safety control device 21 restricts the moving range of the operation target car in accordance with the work area in which the worker is detected. Therefore, even when the operation target car is switched, the operation target car can be smoothly moved.

Further, when the boarding of the worker to the car top area is detected, the safety control device 21 restricts the moving range of the operation target car so that an interval between a boarding car corresponding to a car with the worker on board and an immediately upper car corresponding to a car vertically adjacent to the boarding car is equal to or larger than the second inter-car safety distance "a'". Therefore, the safety distances can be easily secured when the work area is the car top area.

Further, when input from two or more inspection work controllers is detected, the safety control device 21 stops the operations of all of the cars 2 and 3. Therefore, simultaneous movement of the two cars 2 and 3 at the time of maintenance work can be easily suppressed.

Further, the inspection work controller includes the indicator 45 configured to notify the worker that the operation target car is stopped due to the restriction in the moving range by the safety control device 21. Therefore, the worker can smoothly know the movement restriction, and the workability of the maintenance work can be improved.

Further, at the time of inspection operation, when the speed of the operation target car exceeds the upper limit value, the safety control device 21 stops the operation target car. Therefore, high-speed movement of the operation target car at the time of maintenance work can be easily suppressed.

The boarding detection devices are not limited to the first and second guardrail storing switches 38 and 40. For example, a weighing device may be used. At the time of maintenance work, no person is present in all of the cars, and hence the weighing device can detect the boarding of the worker to the car top area. Further, the boarding of the worker to the car top area may be detected based on the car position and the open/closed state of the landing door.

Further, the notification unit is not limited to the indicator, and may be a unit configured to give a notification by letter display, voice sound, buzzer sound, or the like.

Further, the present invention is also applicable to a multi-car elevator system in which three or more cars are raised and lowered in the same hoistway. In this case, the operation target car may be allowed to be selected from all of the cars, or the operation target car may be allowed to be selected from a part of the cars.

Figure 15:
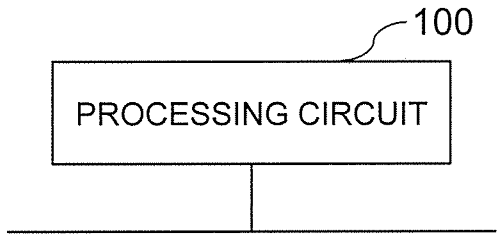
FIG. 15 is a configuration diagram for illustrating a first example of a processing circuit configured to implement each of functions of the safety control device in the first embodiment.

Further, each of the functions of the safety control device 21 in the first embodiment is implemented by a processing circuit. FIG. 15 is a configuration diagram for illustrating a first example of the processing circuit configured to implement each of the functions of the safety control device 21 in the first embodiment. A processing circuit 100 of the first example is dedicated hardware.

Further, the processing circuit 100 corresponds to, for example, a single circuit, a complex circuit, a programmed processor, a processor for a parallel program, an application specific integrated circuit (ASIC), a field programmable gate array (FPGA), or a combination thereof. Further, the respective functions of the safety control device 21 may be implemented by individual processing circuits 100, or the functions may be collectively implemented by the processing circuit 100.

Figure 16:
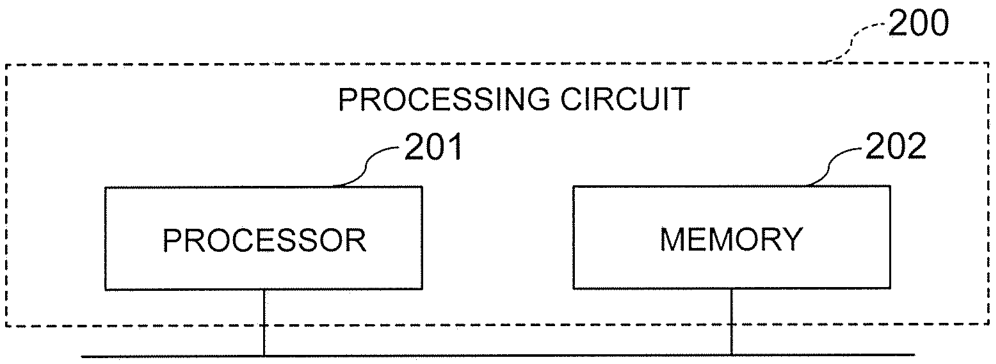
FIG. 16 is a configuration diagram for illustrating a second example of the processing circuit configured to implement each of the functions of the safety control device in the first embodiment.

Further, FIG. 16 is a configuration diagram for illustrating a second example of the processing circuit configured to implement each of the functions of the safety control device 21 in the first embodiment. A processing circuit 200 of the second example includes a processor 201 and a memory 202.

In the processing circuit 200, the functions of the safety control device 21 are implemented by software, firmware, or a combination of software and firmware. The software and the firmware are described as programs to be stored in the memory 202. The processor 201 is configured to read out and execute the programs stored in the memory 202, to thereby implement the respective functions.

The programs stored in the memory 202 can also be regarded as programs for causing a computer to execute the procedure or method of each of the above-mentioned units. In this case, the memory 202 corresponds to, for example, a nonvolatile or volatile semiconductor memory, such as a random access memory (RAM), a read only memory (ROM), a flash memory, an erasable programmable read only memory (EPROM), or an electronically erasable and programmable read only memory (EEPROM). Further, a magnetic disk, a flexible disk, an optical disc, a compact disc, a mini disc, or a DVD may also correspond to the memory 202.

The function of each of the above-mentioned units may be implemented partially by dedicated hardware, and partially by software or firmware.

In this manner, the processing circuit can implement the function of each of the above-mentioned units by hardware, software, firmware, or a combination thereof.

REFERENCE SIGNS LIST

1 hoistway, 1*a* hoistway pit, 2 first car, 3 second car, 6 first car-top controller (inspection work controller), 7 second car-top controller (inspection work controller), 9 landing door switch (pit entry detection device), 10 pit controller (inspection work controller), 13 first operation control device, 14 second operation control device, 15 first control panel connector, 16 second control panel connector, 21 safety control device, 38 first guardrail storing switch (boarding detection device), 40 second guardrail storing switch (boarding detection device), 42 car switching unit, 45 indicator (notification unit), 64 first car connector, 65 second car connector

The invention claimed is:

1. A multi-car elevator system, comprising:

a plurality of cars to be raised and lowered in the same hoistway; and an inspection work controller to be operated by a worker to move an operation target car being one of the plurality of cars, wherein the operation target car is allowed to be selected from two or more of the plurality of cars in a work area in which the worker is present based on an operation performed by the worker using a car switching unit included in the inspection work controller, and wherein the car switching unit is configured to select one car from the two or more of the plurality of cars in the work area as the operation target car.

2. The multi-car elevator system according to claim 1, further comprising:

a pit entry detection device configured to detect entry of the worker into a hoistway pit serving as the work area when the worker is present;

a plurality of boarding detection devices which correspond to the plurality of cars, respectively, and are each configured to detect boarding of the worker to a car top area serving as the work area when the worker is present; and a safety control device configured to restrict, when the entry of the worker into the hoistway pit or the boarding of the worker to the car top area is detected, a moving range of the operation target car in accordance with the work area in which the worker is detected.

3. The multi-car elevator system according to claim 2, wherein, in the safety control device, a first inter-car safety distance and a second inter-car safety distance which is larger than the first inter-car safety distance are set, and wherein the safety control device is configured to restrict, when the boarding of the worker to the car top area is detected, the moving range of the operation target car so that an interval between a boarding car corresponding to one of the plurality of cars with the worker on board and an immediately upper car corresponding to a car vertically adjacent to the boarding car is equal to or larger than the second inter-car safety distance.

4. The multi-car elevator system according to claim 2, further comprising another inspection work controller, and wherein the safety control device is configured to stop operations of the plurality of cars when input from the inspection work controller and the another inspection work controller is detected.

5. The multi-car elevator system according to claim 2, wherein the inspection work controller includes a notification unit configured to notify the worker that the operation target car is stopped due to restriction in the moving range by the safety control device.

6. The multi-car elevator system according to claim 2, wherein, in the safety control device, an upper limit value of a speed of the operation target car for inspection operation is set, and wherein the safety control device is configured to stop the operation target car when the speed of the operation target car exceeds the upper limit value at a time of the inspection operation.

7. A multi-car elevator system, comprising:

a plurality of cars to be raised and lowered in the same hoistway; and an inspection work controller to be operated by a worker to move an operation target car being one of the plurality of cars, wherein the operation target car is allowed to be selected from two or more of the plurality of cars in a work area in which the worker is present based on an operation performed by the worker using the inspection work controller, wherein, in the work area, a plurality of connectors to be connected to the inspection work controller are provided, wherein the operation target car is allowed to be selected based on the operation performed by the worker using the inspection work controller connected to one of the plurality of connectors, wherein the multi-car elevator system further comprises a plurality of operation control devices which are installed in a machine room serving as the work area, and are configured to control operations of the plurality of cars, respectively, and wherein the plurality of connectors are attached to the plurality of operation control devices, respectively.

8. The multi-car elevator system according to claim 7, further comprising:

a pit entry detection device configured to detect entry of the worker into a hoistway pit serving as the work area when the worker is present;

a plurality of boarding detection devices which correspond to the plurality of cars, respectively, and are each configured to detect boarding of the worker to a car top area serving as the work area when the worker is present; and a safety control device configured to restrict, when the entry of the worker into the hoistway pit or the boarding of the worker to the car top area is detected, a moving range of the operation target car in accordance with the work area in which the worker is detected.

9. The multi-car elevator system according to claim 8, wherein, in the safety control device, a first inter-car safety distance and a second inter-car safety distance which is larger than the first inter-car safety distance are set, and wherein the safety control device is configured to restrict, when the boarding of the worker to the car top area is detected, the moving range of the operation target car so that an interval between a boarding car corresponding to one of the plurality of cars with the worker on board and an immediately upper car corresponding to a car vertically adjacent to the boarding car is equal to or larger than the second inter-car safety distance.

10. The multi-car elevator system according to claim 8, further comprising another inspection work controller, and wherein the safety control device is configured to stop operations of the plurality of cars when input from the inspection work controller and the another inspection work controller is detected.

11. The multi-car elevator system according to claim 8, wherein the inspection work controller includes a notification unit configured to notify the worker that the operation target car is stopped due to restriction in the moving range by the safety control device.

12. The multi-car elevator system according to claim 8, wherein, in the safety control device, an upper limit value of a speed of the operation target car for inspection operation is set, and wherein the safety control device is configured to stop the operation target car when the speed of the operation target car exceeds the upper limit value at a time of the inspection operation.

* * * * *